Jan. 31, 1967     H. A. THOMPSON     3,301,255
METHOD AND APPARATUS FOR APPLICATION OF NEBULIZED
MEDICATION IN POSITIVE PRESSURE
RESPIRATORY EQUIPMENT
Filed Oct. 18, 1963     4 Sheets-Sheet 1

INVENTOR.
Harris A. Thompson
BY
Frank C. Lowe
ATTORNEY

INVENTOR.
Harris A. Thompson
BY Frank C. Lowe
ATTORNEY

Jan. 31, 1967  H. A. THOMPSON  3,301,255
METHOD AND APPARATUS FOR APPLICATION OF NEBULIZED
MEDICATION IN POSITIVE PRESSURE
RESPIRATORY EQUIPMENT
Filed Oct. 18, 1963  4 Sheets-Sheet 3
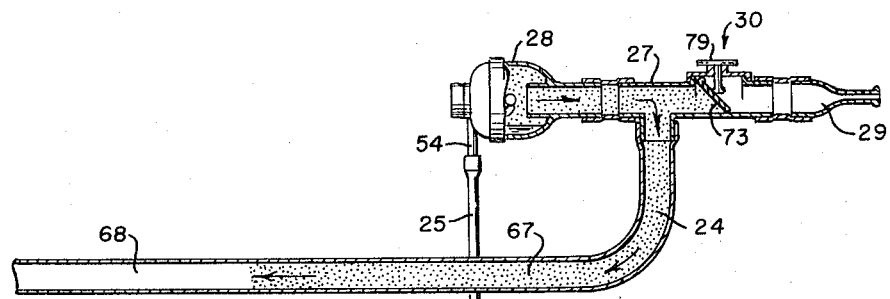
Fig. 13
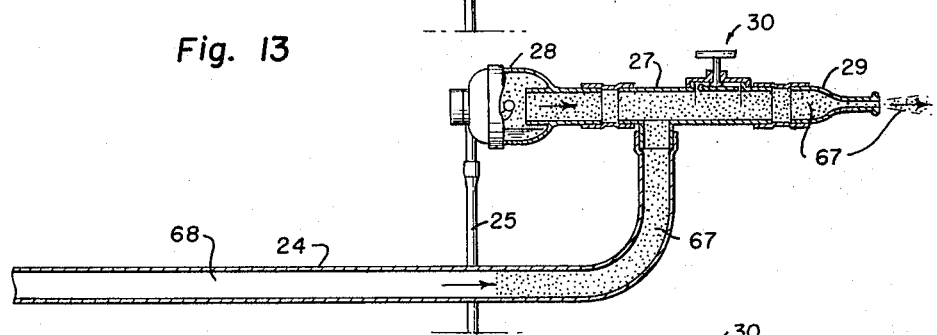
Fig. 14
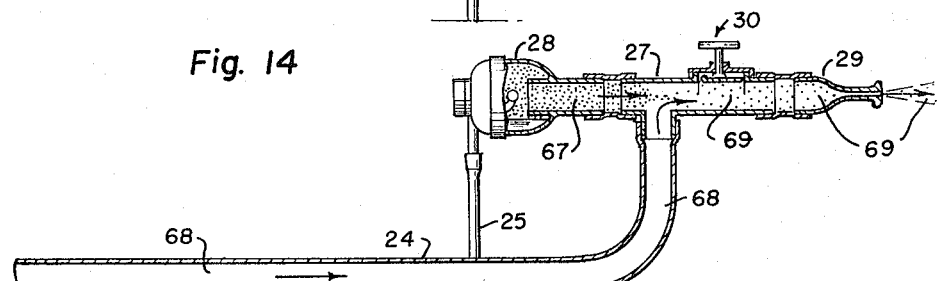
Fig. 15
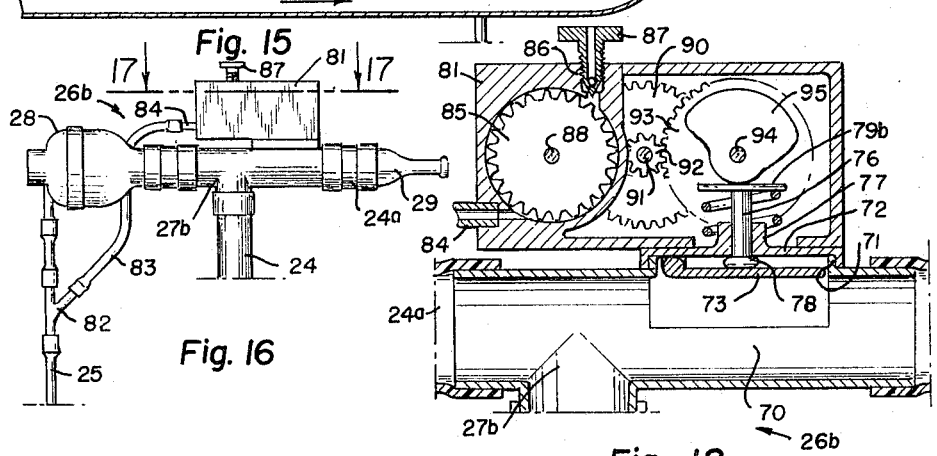
Fig. 16
Fig. 18
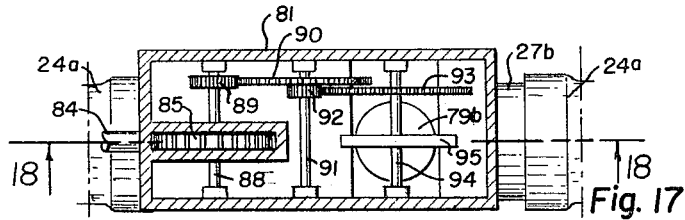
Fig. 17
INVENTOR.
Harris A. Thompson
BY Frank C. Lowe
ATTORNEY

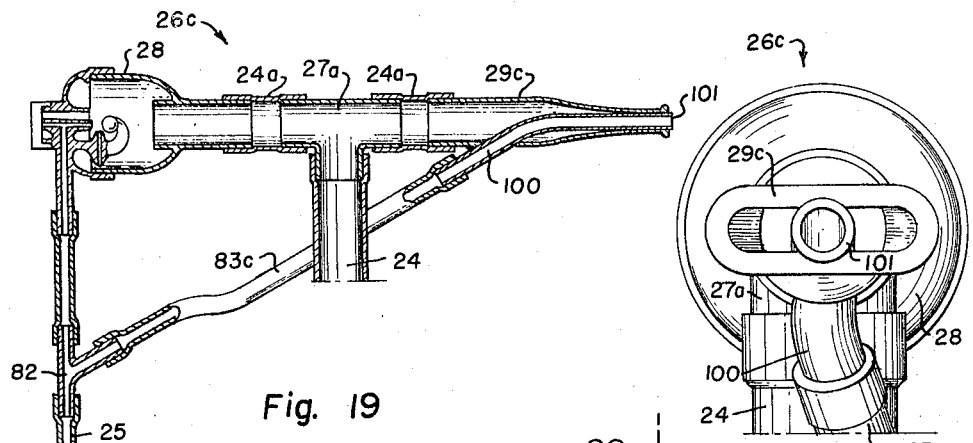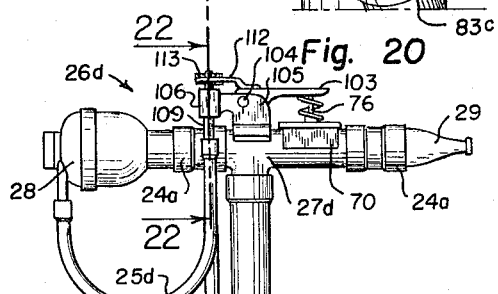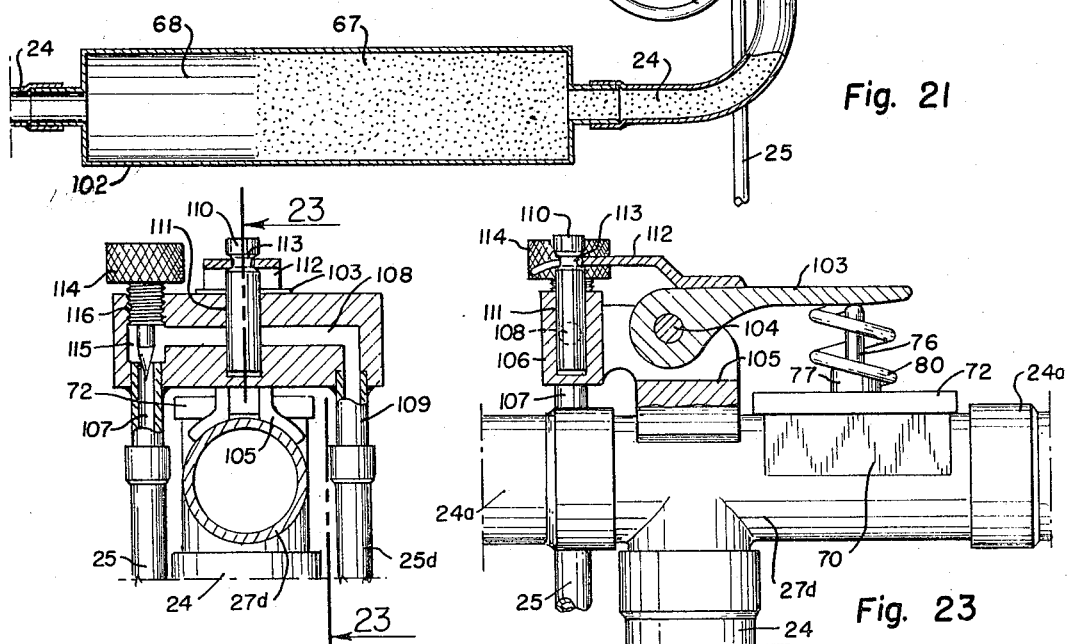

United States Patent Office 3,301,255
Patented Jan. 31, 1967

3,301,255
METHOD AND APPARATUS FOR APPLICATION OF NEBULIZED MEDICATION IN POSITIVE PRESSURE RESPIRATORY EQUIPMENT
Harris A. Thompson, P.O. Box 916,
Boulder, Colo. 80302
Filed Oct. 18, 1963, Ser. No. 317,170
15 Claims. (Cl. 128—194)

This invention relates to methods and apparatus for treating respiratory ailments and more particularly to methods and apparatus for facilitating vaporous medication and for providing forced vaporous medication to patients having respiratory ailments such as chronic pulmonary emphysema, chronic bronchitis, bronchitis asthma, bronchiectasis, pulmonary fibrosis, bronchitis fibrosa obliterans, pulmonary arteriosclerosis and pneumoconiosis.

Vaporous medication as generally applied for respiratory troubles involves atomizing, or nebulizing a fluid medicament to permit the patient to take the same by inspiration. Simple bulb-type hand atomizers are commonly used for this purpose to treat colds and minor respiratory ailments. However, for the more serious cases, such as for severe asthma or for emphysema, breathing may be so difficult for the patient that simple hand sprays are ineffectual and the medication must be applied through forced inspiration.

Vaporous medication may be effectively applied with positive pressure types of respiratory apparatus which are modified to include a nebulizer attachment to infuse an atomized or nebulized mist or spray of medicine into the breathing tubes of the respiratory apparatus during an inspiration cycle of forced breathing. Several kinds of positive pressure respiratory apparatus having nebulizer attachments are generally available and are in use. The present invention is concerned with improvements in the arrangements and in the use of such apparatus to more effectively apply vaporous medication with the apparatus.

A primary object of the invention is to provide a novel and improved method of operating a positive pressure breathing apparatus having a nebulizer attachment thereon which more effectively increases the concentration of nebulized medicament within a patient's lungs during an inspiration cycle, and at the same time substantially reduces the amount of medicine which is wasted.

Another object of the invention is to provide a novel and improved method for infusion of vaporous medication into a patient's lungs with a positive pressure breathing apparatus and in a manner which substantially increases the speed of reaction of the patient to the medicine and produces quicker results as when the patient is seeking relief from a seizure.

Another object of the invention is to provide a novel and improved method for infusion of vaporous medication into a patient's lungs in a manner which permits the patient to receive a maximum amount and concentration of the medication without overtaxing the patient's tolerance to the taste of the medication in his mouth and throat.

Another object of the invention is to provide improved and simplified modifications to a conventional positive pressure breathing apparatus which permit its use in practicing improved methods of operation and improved methods of infusing a vaporized medication into a patient's lungs.

Another object of the invention is to provide novel and improved means for controlling the flow of vaporized medication from the breathing tube of a positive pressure breathing apparatus and to the patient in order to place maximum effective medication in the patient's lungs and a minimum of medication in his mouth and throat.

Another object of the invention is to provide a novel and improved means for supplementing a positive pressure breathing apparatus which permits it to use improved and efficient methods of infusing a vaporized medication into a patient's lungs.

Other objects of the invention are to provide a novel and improved method for infusing medicated vapor in a patient's lungs with a positive pressure breathing apparatus which involves simple, effective, easily understood and easily practiced steps and operations.

Other objects of the invention are to provide in an improved positive pressure breathing apparatus certain constructions which permit the use of the apparatus for infusing medicated vapor into a patient's lungs, which are simple, low-cost, neat-appearing, reliable and durable.

With the foregoing and other objects in view, all of which more fully hereinafter appear, my invention comprises certain sequences, steps, and operation and certain constructions, combinations, parts and elements, all as hereinafter described, defined in the appended claims and exemplified and illustrated in the accompanying drawing, in which:

Figure 9:
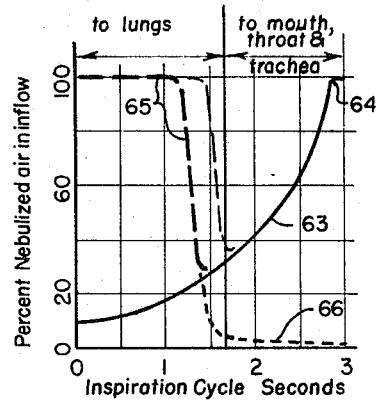

FIGURE 9 is a graph showing the variation of concentration of the nebulized medication during an inspiration cycle, the full-line curve showing the variation of concentration when a conventional arrangement of apparatus is used in a conventional manner and the broken line curve showing the concentration of nebulized medication which will be obtained with a modified apparatus and by my improved method of application.

Figure 5:
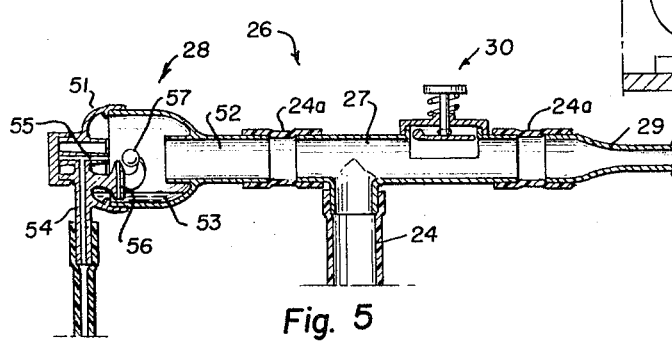
FIGURE 5 is a longitudinal, sectional elevational view of a breather head of the type illustrated as being used at FIG. 1, but on an enlarged scale.
Figure 10:
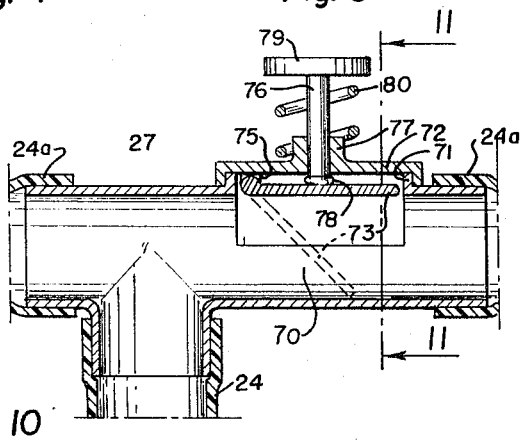

FIGURE 10 is a fragmentary portion of the longitudinal sectional view illustrated at FIG. 5, but on an enlarged scale and with broken lines indicating an alternate position of the valving element therein.

Figure 11:
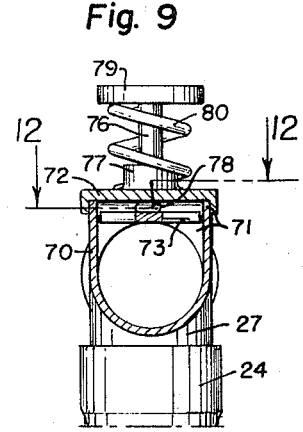

FIGURE 11 is a fragmentary sectional view as taken from the indicated line 11—11 at FIG. 10.

Figure 12:
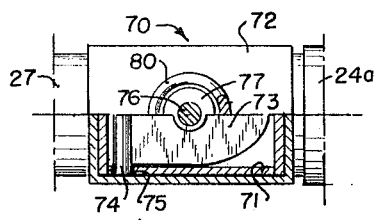

FIGURE 12 is a fragmentary detail partially in section, as taken from the indicated line 12—12 at FIG. 11.

FIGURES 13, 14, and 15 are diagrammatic sectional views similar to the showing at FIG. 5, but illustrating the air flow and nebulizer flow at the head of the apparatus and indicating sequentially, the manner in which the respective flows are regulated when using the apparatus in accordance with the principles of the invention.

Figure 1:
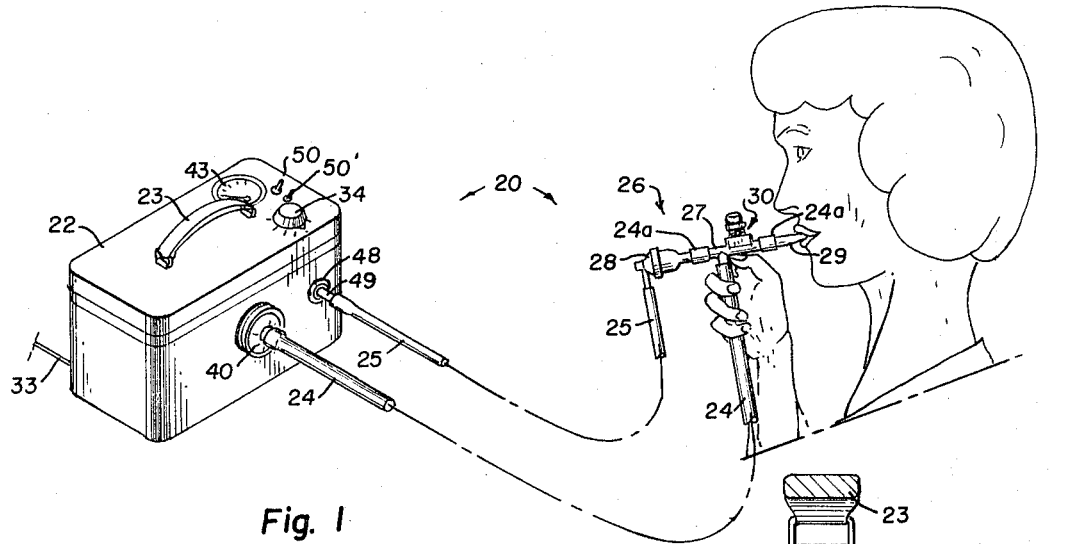
FIGURE 1 is a diagrammatic, isometric view of an improved positive pressure breathing apparatus which may be used to practice the invention, the figure showing the breathing apparatus air supply unit, lines extending therefrom, with portions broken away to conserve space, and a breather head connected thereto.

FIGURE 16 is a side elevational view of a mixing head, similar to the showing at FIGS. 1 and 5 but modified to include an automatic cycling means.

FIGURE 17 is a fragmentary sectional plan view as taken from the indicated line 17—17 at FIG. 16, but on an enlarged scale.

FIGURE 18 is a fragmentary, sectional elevational view as taken from the indicated line 18—18 at FIG. 17.

FIGURE 19 is a sectional elevational view of a breathing head similar to the showing at FIG. 16, but illustrating a modified arrangement of the air supply tubes therein.

FIGURE 20 is a right end view of the breathing head illustrated at FIG. 19, but taken on an enlarged scale.

FIGURE 21 is a diagrammatic view, partially in section, similar to the arrangement illustrated at FIG. 13, but showing a modified passageway construction and a further modified arrangement of operative controls which will provide a more efficient use of neubulized medication according to a selected pattern.

FIGURE 22 is a transverse sectional elevational view as taken from the indicated line 22—22 at FIG. 21, but on an enlarged scale.

FIGURE 23 is a fragmentary sectional elevational view as taken from the indicated line 23—23 at FIG. 22.

Referring more particularly to the drawing, the positive pressure breathing unit 20 is illustrated at FIG. 1 and is suitable for use in connection with the present invention. The unit is formed in a portable case, having a box-like body 21 enclosed by a lid 22 and carried as by a handle 23. A breathing tube 24 and a pressure tube 25 extend from a wall of this case and to a breather head assembly 26 which is used by a patient. These tubes are of a firm, flexible material and are preferably formed of a transparent, tough but pliable synthetic resin of a type commonly used in laboratory and food processing work. The breathing tube provides air under a selected low pressure for the positive pressure respiration action to the patient while the pressure tube 25 provides a smaller flow of air under pressure to operate a nebulizer as hereinafter described.

The breather head 26 is formed about a T 27, the leg of which connects with the breathing tube 24. A nebulizer 28 is connected to one arm of the T 27 as by a short piece of tubing 24a and the nebulizer, in turn, connects with the pressure tube 25. A mouthpiece 29 is connected to the other arm of the T 27 as by a short piece of tubing 24a to complete the assembly. With this arrangement, both air and medicated mist are discharged from the mouthpiece for use by a patient as in the manner illustrated.

To practice the invention, the T also includes a valving arrangement 30 which will be hereinafter described in detail.

Figure 2:
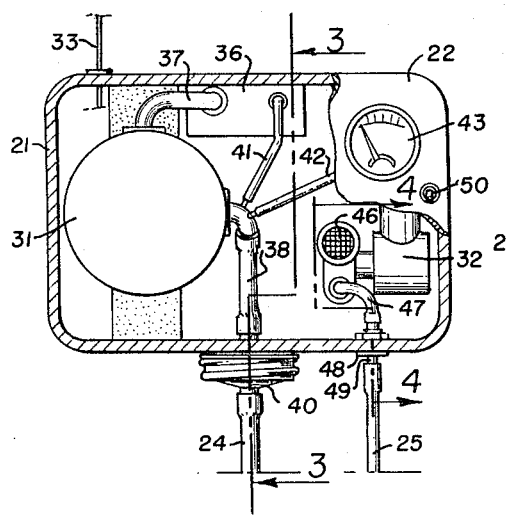
FIGURE 2 is a plan view of the positive pressure breathing unit illustrated at FIG. 1, but with lid portions thereof being broken away to show components of the unit within the machine.
Figure 3:
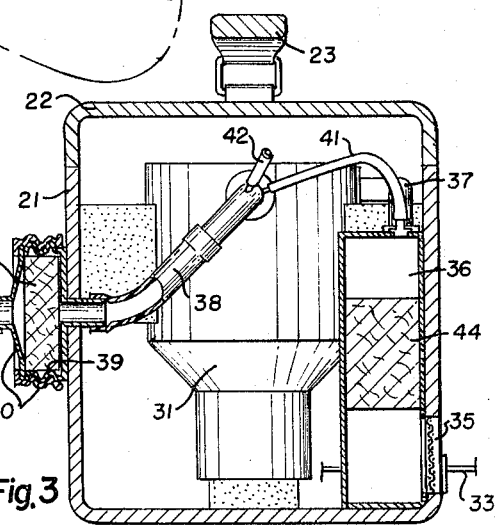
FIGURE 3 is a transverse sectional elevational view of the apparatus as taken substantially from the indicated line 3—3 at FIG. 2, but on an enlarged scale.
Figure 4:
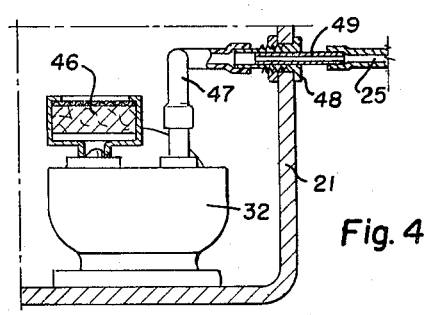
FIGURE 4 is a framentary sectional detail as taken from the indicated line 4—4 at FIG. 2, but on an enlarged scale.

The parts and components within the case of the unit 20 which provide air to the tubes 24 and 25 are illustrated in a diagrammatic manner at FIGS. 2, 3, and 4 since these components are essentially conventional. A high-volume, low-pressure blower 31 supplies air to the breathing tube 24 with a continuous flow, and an air pump 32 of comparatively smaller capacity supplies air under moderate pressure to the pressure supply tube 25. The blower and pump are both operated by small electric motors within them, and a suitable cord 33 extends from the case of the unit 20 for connection with a conventional power supply plug. The actual electrical circuits operating the blower are not shown since they are conventional, but they include a rheostat control 34 which varies the speed of the blower 31 and consequently varies the pressure of the air supply from it. This permits selective adjustment of the operative pressure to suit the needs and desires of a patient.

The conduits and connections extending to the blower 31 and thence to the primary breathing tube 24, commence at an intake opening 35 at the back wall of the case 20. This opening communicates with a filter can 36 adjacent to its base. A short intake line 37 extends from the top of the can 36 to the intake of the blower 31. A discharge line 38 extends from the blower through the front wall of the case and to a flat, disc-shaped filter cup 39 at the face of the case. This filter cup 39 is capped by a flat, funnel-shaped lid 40 having a centered spout which connects with the tube 24.

In addition to the direct passageway from the intake opening 35 through the blower 31 and to the tube 24, a small bypass tube 41 connects with the discharge line 38 and extends to the filter can 36 or to the exterior of the case. The purpose of the bypass tube 41 is to prevent a back flow of air into the blower 31 should the breathing apparatus be closed at the breather head as in the manner hereinafter further described. A pressure indicating tube 42 is positioned alongside the bypass tube and extends to a pressure gage 43 which is conveniently mounted on the lid 22 of the case adjacent to the rheostat control 34. This gage facilitates easy setting of a selected operating pressure in the breathing tube. Filters 44 and 45 are positioned in the filter can 36 and in the filter cup 39, respectively, and such filters are adapted to keep the air entering the apparatus through the intake and the air which is being pumped through the breathing tube absolutely clean and free of all dust particles.

The pump 32 is adapted to pump a smaller quantity of air through the pressure supply tube 25 to operate the nebulizer 28. Accordingly, this pump may be a smaller unit than the blower. The circuits and connections associated with this pump include a filter head 46 at its intake and a discharge line 47 which terminates at a connector 48 at the face of the case alongside the breathing tube connection. This connector 48 is preferably a female receptacle which is adapted to receive a short jack 49 at the end of the pressure supply tube 25 for quick, easy connection when the pressure supply tube is used. A switch 50 may be used to turn the apparatus on, and a second switch 50' may be included to turn off the pressure pump 32 when it is not needed.

The nebulizer 28 is a conventional type known as "Vaponefrin" and is representative of several common types which are all constructed according to a similar pattern. This nebulizer 28 is formed as a cup-like member which is closed by a cap 51 and which has discharge tube 52 extending from its base. The discharge tube 52 is connected to the arm of the T 27 by the short tubing piece 24a as hereinbefore described. The nebulizer cup, cap, and tube are adapted to lie in a horizontal position when in use so that a desired amount of liquid medication 53 lies in the lower portion of the side of the cap. A short pipe 54 extends downwardly from the cap to be connected with the pressure supply tube 25 and this pipe 54 extends into the cap to connect with an axially centered nozzle 55. A short suction tube 56 having its intake submerged in the medication 53 extends upwardly to the nozzle, and a small impact ball 57 is mounted in line with the exhaust of the nozzle to complete the unit.

The positive pressure breathing unit 20 may be used for several purposes. It may be used without medication where only the breathing line 24 is needed as for assisting a patient in breathing. In such use the mouthpiece 29 may be connected directly to the breather tube 24 or it may be connected to one leg of a T at the end of the tube 24, or to a more elaborate control for regulating the inspiration and expiration of a patient. With the mouthpiece directly connected to the breathing tube, providing a continuous flow, the patient will have to regulate his inspiration and expiration manually by simple movements such as by removing the mouthpiece during the expiration cycle of breathing. When the mouthpiece is connected to a leg of a T at the end the line 24, the open leg of the T may be closed manually by the patient during inspiration and then opened to form a bypass during expiration. For patients having more difficult respiration problems where manual operation is not desirable, a more elaborate, automatic valving arrangement may be used and ordinarily this will require other types of artificial respiration apparatus which are not ordinarily used for medication.

The addition of a nebulized spray of a medicament to the air flow of the breather tube 24 provides a useful and effective way of treating patients for asthma, emphysema and a number of other pulmonary troubles. The forced inspiration available with this apparatus permits the patient to inhale the nebulized medicament into his lungs without the intense fatigue which would occur with natural breathing. Even when a patient can inhale without assistance, with natural breathing, the undesirable taste of some types of a medicated spray will often produce a gagging effect in the patient's mouth and throat and prevent him from inhaling the medication sufficiently to produce beneficial effects. For this reason various types of positive pressure breathing apparatus usually include, directly or indirectly, auxiliary apparatus such as the pressure supply tube 25 which produces pressurized air which may be connected to a nebulizer in the breathing head arrangement. In a conventional arrangement of this sort, there is usually a side outlet in the T forming the breathing head which may be operated mechanically or manually to be closed during inspiration and to be opened during expiration. When open, not only the expired air, but also the air flow from the blower and from the nebulizer will be discharged to the atmosphere through this outlet.

Several objections exist to this conventional mode of operation, which involves bypassing the air flow through the breather tube and the flow of nebulized medication to the atmosphere during the expiration cycle of breathing. The most obvious objection, that is of wasting medication, is generally overlooked because the amount of medication lost is comparatively small, although certain of newer types of medicines for this purpose are quite expensive and the loss by waste becomes significant. Another, more important objection which has not been fully appreciated, relates to the comparative concentration of medication received by the patient in his mouth, throat and lungs upon completion of an inspiration cycle of breathing. The medical profession has evidently overlooked or ignored this factor until its significance was demonstrated by procedures using the concepts of the present invention.

Figure 7:
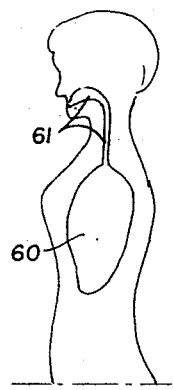
FIGURE 7 is a diagrammatic view of a person's torso indicating the outline of the lung cavity and of the mouth and throat passages therein.
Figure 8:
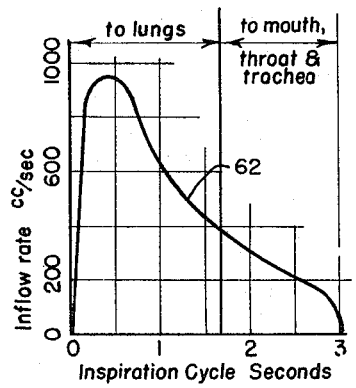
FIGURE 8 is a graph showing the variations of the rate of inflow with time during an inspiration cycle and indicating the portion of the inspiration air which is in the lungs and which is in the mouth and throat passages at the completion of an inspiration cycle.

FIGURES 7, 8, and 9 are illustrative of the nature of this factor. FIG. 7 illustrated diagrammatically in the outline of a human body the lungs 60 and the mouth, throat and trachea collectively as 61. The comparative air volumes of the lungs 60 and the mouth, throat, and trachea 61 will vary with the individual. These respective volumes are approximately 700 cc. for the lungs 60 and 300 cc. for the combined volumes of the mouth, throat, and trachea 61.

FIGURE 8 illustrates graphically the rate of air inflow, the curve 62, during an inspiration cycle of breathing when a patient is assisted by a positive pressure breathing unit such as 20. It is to be noted that the air inflow commences at a maximum rate and this rate decreases as the patient's lungs fill, terminating at the completion of the inspiration cycle, in approximately three seconds. The portion of air inhaled in approximately the first 1.6 second reaches the patient's lungs 60 and the remainder of the air remains in the patient's mouth, throat, and trachea 61.

FIGURE 9 illustrates graphically, the variation of concentration of medication during an inspiration cycle such as that illustrated at FIG. 8. It is to be noted first, that the air inflow during inspiration will be supplied by both the breathing tube 24 and by the pressure tube 25, the latter being a smaller inflow, also that the air flowing through the breathing tube 24 is at a comparatively low pressure and that this air flow will easily change and will stop when the patient's lungs fill to create a back pressure. On the other hand, the smaller air flow through the pressure supply tube 25 to create a nebulized mist of medication is at a comparatively high pressure so that its flow rate is at a nearly constant throughout both the inspiration and expiration cycles of breathing. It is to also be noted that the maximum concentration of the medication which can be inspired by the patient will be a flow entirely from the pressure supply tube, and that the actual concentration will be determined by the comparative air flows from the breathing tube 24 and pressure supply tube 25 for the nebulized medication created by the air flow through the pressure tube 25 will be diluted by the air flow in the breathing tube 24. It is then obvious that with a maximum air inflow, as at the beginning of an inspiration cycle, the medication from the pressure tube flow is diluted to its maximum extent or to its minimum concentration. As the air inflow rate decreases during the inspiration cycle, the concentration of medication necessarily increases and becomes a maximum at the point where the entire air inflow is supplied by the flow through the pressure tube 25 which creates the nebulized medication. This is shown by the concentration curve 63 at FIG. 9 which increases from a minimum at the commencement of the inspiration cycle to a maximum point 64 shortly before the completion of the cycle.

Further consideration of this action makes it apparent that the portion of the air reaching the patient's lungs 60 is at minimum concentration and the portion remaining in his mouth, throat, and trachea 61, and especially that in his mouth will be at maximum concentration, upon completion of the inspiration cycle. This is precisely the opposite to that which is logically desirable, for the ideal condition would be to have a maximum concentration of nebulized medication in the alveoli of the lungs where it may produce a beneficial effect to the patient and a minimum concentration in his mouth for the taste of the medication may be quite repulsive.

The present invention establishes a method and procedure whereby the concentration of medication in the portion of air flow which reaches the patient's lungs is also a maximum. The concentration relationship during inspiration is modified as in the manner shown by the curve 65, which is shown as a dashed line at FIG. 9. As a further refinement, a procedure is established whereby the concentration of medication of the air flow is reduced during the latter portion of the inspiration cycle as in the manner shown by the concentration curve 66 which is shown as a dotted line at FIG. 9 as an alternate continuation of the curve 65 as will be explained.

Several advantages are immediately apparent. Less medication will be used; the patient will not be required to hold a concentration of medication in his mouth which is considerably greater than that which is in his lungs, as will be hereinafter apparent; the medication is not wasted; and, the time required for the medication to take effect will be materially reduced. This latter effect was demonstrated with startling results in tests using a medication adapted to relieve asthma. The reaction time in using the conventional procedure was approximately 15 minutes, while the reaction time according to the improved procedure was about 3 minutes.

The basic steps of my improved method, using the apparatus hereinabove described, to increase the concentration of medication at the beginning of a patient's inspiration cycle of breathing consists in creating a back flow of air carrying a nebulized medication from the pressure supply tube into the breathing tube 24 during the patient's expiration cycle of breathing whereby a supply of air carrying the nebulized medication at a maximum concentration is available to the patient at the commencement of the inspiration cycle. In contrast with ordinary operations which either stops or bypasses the flows of air from the breathing tube 24 and from the pressure supply tube 25 to the atmosphere during the patient's expiration cycle, the present invention requires a closing-off of outflow from the breathing head during the expiration cycle. This creates a back flow of medicated air from the pressure supply tube and into the breathing tube. This may be accomplished by the valving arrangement 30 heretofore mentioned and now described or by other means and in other ways as will be hereinafter described.

The valve 30 is formed as a U-shaped section 70 in the arm of the T 27 adjacent to the mouthpiece. This section 70 is rounded at its lower portion with upright substantially-parallel sidewalls which extend to the upper, top portion of the section. This upper portion is a rectangular-shaped opening formed by upturned lips 71 and is closed by a cap 72 mounted thereover. A light-weight flap valve 73 is pivotally mounted in the opening above the passageway through the T with hinge pintle stubs 74 outstanding from each corner of the leading edge of the flap valve, with respect to the direction of air flow. These stubs 74 lie in sockets 75 formed in opposing lips 71 so that the flap valve may swing downwardly to close the passageway through the T. This flap valve is generally rectangular in form adjacent to the hinge portion and elliptical at its outer or lower end and of a length such that it will effectively close the passageway when it is swung downwardly at an angle of approximately 45 degrees, as shown in a broken line position at FIG. 10. It is to be noted that with the hinge at the leading edge, with respect to the air flow, this light-weight flap valve will automatically open responsive to a slight pressure creating an air flow through the breathing head.

The flap valve is closed by downward movement of a plunger 76 which is slidably carried in a tubular boss 77 in the cap 72. The plunger is formed with an enlarged head 78 at its base to prevent its sliding upwardly and out of the boss 72 and it is formed with a finger button 79 at its top which may be pressed to depress the plunger and close the valve as in the manner clearly illustrated at FIG. 1. This plunger is adapted to remain normally in its up position by a compression spring 80 which is placed between the cap 72 and the button 79.

Selected phases of the operation of the breathing head of the positive pressure unit in accordance with the principles of the invention are set forth at FIGS. 13, 14, and 15. These figures show portions of the breathing head and of the breathing tube 24 in section. The air flow from the pressure supply tube 25 through the nebulizer 28, which carries the nebulized medication, is indicated as the compactly dotted area and will be referred to as the nebulized flow 67. The air flow normally passing through the breathing tube 24 is indicated as a clear area and will be referred to as the breathing flow 68. The flow resulting from the blending of the nebulized flow 67 and the breathing flow 68 being indicated at a lightly dotted area at FIG. 15 will be referred to as a mixed flow 69.

FIG. 13 illustrates the action within the breathing head and the adjacent portion of the breathing tube 24 during expiration by the patient. In accordance with the present invention, the flap valve 73 is closed, and the discharge from the breathing head to the mouthpiece is shut off. This causes the breathing flow 68 through the tube 24 to cease but the higher pressure nebulized flow 67 continues at its comparatively steady rate and necessarily backs up in the breathing tube 24. This reverse flow into the breathing tube continues throughout the expiration cycle and until the valve 73 is again opened.

By proper selection of the nozzle 55, correlated with the air pressure in the supply tube, a selected volume of nebulized flow 67 may be backed up into the breathing tube 24 during the expiration cycle which may be equivalent to a selected portion of the volume of inspired air. If this back flow is permitted to continue for an excessive time interval, the entire breathing tube will fill, and the back flow will be discharged through the bypass tube 41. This bypass tube thus prevents the nebulized flow from backing up into the blower 31. Accordingly, the bypass is an important feature when the apparatus is operated as above described because the medicines in the nebulized flow will gum-up or otherwise damage the moving parts within the blower 31.

FIG. 14 illustrates the action when the valve 73 is opened to commence an inspiration cycle. The release of back pressure by opening this valve causes the breathing flow 68 to resume its movement through the head 26. However, first the nebulized air 67 which accumulated in the tube during the inspiration cycle must be ejected through the mouthpiece. At the same time a nebulized flow 67 from the nebulizer 28 continues to be ejected from the mouthpiece with the result that the patient inspires a maximum concentration of medicated air during the first portion of his inspiration cycle and until the entire amount of nebulized air flow 67 which was stored within the breathing tube 24 during the expiration cycle is ejected from the mouthpiece. Thus, the first portion of the inspiration cycle, and that portion of the air which flows into the patient's lungs is at the maximum concentration of medicated air.

FIG. 15 illustrates the action during the latter portion of the inspiration cycle after the normal breathing flow 68 has completely ejected the medicated air 67 from the breathing tube 24. Then the breathing flow 68 mixes with the nebulized flow 67 which continues to come from the nebulizer 28 to provide a mixed flow 69 of varying concentration. This variation of concentration during the latter portion of the inspiration cycle is substantially accordingly to the conventional pattern heretofore described and indicated as the latter portion of the inspiration curve 63 at FIG. 9.

The above described sequence of operation can be accomplished with means other than the valving arrangement 30. Where the patient is capable of operating this apparatus manually, and the pressure of the breathing flow 68 is not great, a more simple breathing head *26a* may be used, such as the construction illustrated at FIG. 6. This breathing head *26a* is connected to the breathing tube 24 and the pressure supply tube 25 as hereinabove described, but includes a T *27a* which does not have the valving arrangement 30. As aforedescribed one arm of this T is connecting the nebulizer 28 and the other arm is connected to the breathing tube 29 as hereinabove described. In use of this device, the patient may close off the mouthpiece 29 with his tongue or by rolling the mouthpiece onto his lower or upper lip to obtain precisely the same effect as that hereinabove described using the valve 30. As a further variation, the mouthpiece 29 may be of a flexible material so that the closing may be accomplished by a biting action.

In many instances it is necessary that the breathing action be controlled automatically since the patient may be unable to fully regulate the inspiration and expiration cycle in the manner above described, and the invention contemplates a simplified automatic regulating apparatus *30b* which may be added to the T *27b* as in the manner illustrated at FIGS. 16, 17, and 18. This apparatus is conveniently operated with the pressurized air flow from the pressure supply tube 25. The control apparatus may be formed within a case 81 which upstands from the T *27b* and a Y-branch 82 is located in the pressure supply line near the junction of the nebulizer with one leg of this Y-branch extending to the nebulizer and the other leg joining a short connective tube 83 which leads to a driving connection pipe 84 outstanding from the case 81.

The case 81 is formed as a small rectangular box suitably affixed to the cap 71 over the valve section 70. A gear wheel 85 is mounted in an enclosure within the case to act as a simple gear pump having its inlet at the connection pipe 84 and its outlet 86 at the top of the case, so that air flow about a portion of the periphery of the gear 85 rotates this gear. A simple flow-control needle valve 87 is threaded into this outlet to regulate the air speed and the speed of rotation of the gear 85. This gear 85 is mounted on a transverse shaft 88 which is carried in suitable bearings in the case 81. The shaft 88 carries a pinion 89 connecting with a gear 90 mounted on an idler shaft 91 paralleling shaft 88. The idler shaft 91 carries a pinion 92 which in turn connects with a gear 93 on a cam shaft 94 paralleling the other shafts. The cam 95 bears against a follower button 79b on the plunger 76 which operates the flap valve 73 as in the manner hereinbefore described. The cam 95 is so shaped and the train of gears 85, 89, 90, 92, and 93 are so selected as to provide a speed of rotation at the cam of approximately six seconds per revolution, the cyclic interval required to complete both the inspiration and expiration cycles of breathing. However, it is possible to easily vary this time period several seconds each way by adjustments of needle valve 87 or by using certain types of pressure sensitive valves which may be triggered by the patient.

Where a foul tasting medication is to be used, the apparatus may be modified further to reduce the concentration of medication during the latter portion of the inspiration cycle of breathing to obtain a condition such as that shown by the dotted curve 66 at FIG. 9. This will also permit a better determination of the amount of medication required by the patient since substantially all medication inhaled will be effective. To accomplish this, the operation hereinabove described is modified to cut off the nebulized flow 67 during the inspiration cycle of breathing so that during the latter part of the cycle only a breathing flow 68 of fresh air will occur. Then, only the breathing flow 68 will remain in the patient's mouth at the completion of the inspiration cycle while a good concentration of nebulized flow will remain in his lungs.

Figure 6:
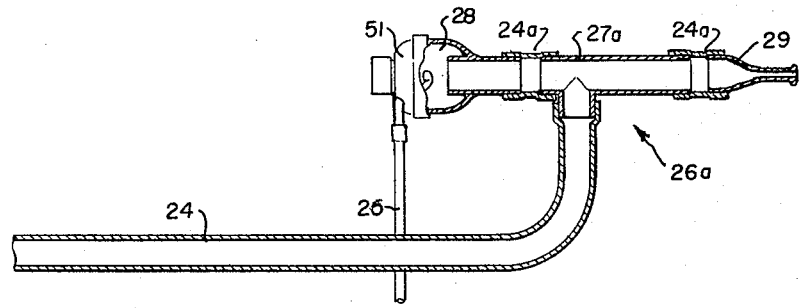
FIGURE 6 is a longitudinal, sectional view similar to the showing at FIG. 5, but illustrating a simplified construction thereof.

The construction at FIGS. 19 and 20 illustrate a modified manual breathing head 26c, similar to the unit illustrated at FIG. 6. A Y-branch 82 is placed in the pressure supply tube 25 adjacent to the nebulizer 28 and a connecting tube 83c from the branch leg of this Y will extend to a rigid diverter tube 100 which extends into the mouthpiece 29c to terminate at an exit opening 101 at the exit end of the mouthpiece.

The operation of the breathing head 26c is simple and substantially that described for the breathing head 26a illustrated at FIG. 6. The patient closes off both the exit of the mouthpiece and the exit 101 with his tongue during the expiration cycle of breathing. Then, the only air flow which can pass is that through the nebulizer 28 to fill the breathing tube 24 with a nebulized flow as in the manner illustrated at FIG. 13. When the patient commences his inspiration cycle by removing his tongue from the exit, the air flow through the mouthpiece is as hereinbefore described except that the bypassed air flow from the pressure supply tube 25 via the Y-branch 82, the conduit 83c, and the diverter tube 100 causes the nebulizer to cease its operation. This diversion of flow creates a pressure drop in the air flow through the nebulizer which is sufficient to prevent a suction effect in the tube 56 and a subsequent nebulizing flow action. Therefore, when the supply of nebulized flow 67, which backs up into the breathing tube 24 during an expiration of breathing is moved out of the tube 24, no additional nebulized flow 67 will be inspired and a condition similar to the curve 66 at FIG. 9 is obtained.

FIGURES 21, 22 and 23 illustrate a mechanical means for accomplishing the same action and illustrate also the use of a tubular reservoir 102 in the breathing tube 24 which is adapted to avoid excess filling of the breathing tube 24. This reservoir 102 is simply an enlargement of the breathing tube 24 for a selected distance and is adapted to fill with medicated air during a patient's expiration cycle as in the manner hereinbefore described.

The breathing head 26d illustrated at FIGS. 21, 22, and 23 is formed substantially as that hereinbefore described but includes a modified construction for depressing the plunger 76 to close the flap valve 73. This modified unit is formed as a lever 103 pivotally mounted to a shaft 104 which, in turn, is carried in a bearing 105 upstanding from the top of the T 27d.

The pressure supply tube 25 is cut off by a valve in this modification and the construction includes a transverse valve case 106 mounted on the bearing 105. A short tube connector 107 depends from one side of this case and is connected to the pressure supply tube 25. The valve case is formed with a passageway 108 through it, and commencing at connector 107, the passageway terminates at a short connector 109 opposite the connector 107. A short tube 25d is attached to this connector 109 and extends, thence, to the nebulizer 28. This valve is operated by a cut-off plunger 110 which is slidably mounted within a socket 111 which traverses the passage 108 as in the manner clearly illustrated at FIGS. 22 and 23. This plunger 110 is connected to a split finger 112 which is attached to the lever 103. A notch 113 is formed in the plunger 110 facilitating its connection to the split in the finger 112.

The pressure of the lever 103 to close the valve 73 heretofore described acts to lift the plunger 110 and open the passageway 108, and it is apparent that the operation will permit a nebulized flow 67 only during an expiration cycle of breathing and will shut off the nebulizer flow 67 completely during an inspiration cycle of breathing.

With such apparatus it becomes desirable to control the quantity of nebulized flow 67 which is backed up into the breather tube 24, accordingly, a needle valve 114 is provided in the valve case 106 which extends into an enlarged socket 115 in the passageway 108 with a needle of the valve 114 extending into the passageway of the connector 107. This needle valve 114 is formed with a threaded base which fits in with a threaded socket 116 in the unit 106 as in the manner clearly illustrated at FIG. 22. Also, it is possible to use automatic valves of a construction analogous to that illustrated at FIGS. 16, 17, and 18 to cut off the flow from the nebulizer during inspiration.

I have now described my invention and its ramifications in considerable detail, however, it is obvious that others skilled in the art can devise alternate and equivalent operations and can build alternate and equivalent constructions which are all within the spirit and scope of my invention. Hence, I desire that my protection be limited, not by the constructions illustrated and described, but only by the scope of the appended claims.

I claim:
1. Apparatus for positive pressure breathing therapy adapted to interblend a low-pressure primary air flow with a high-pressure secondary air flow carrying a nebulized medicament and including, in combination:
   (a) means for supplying a primary air flow at low pressure, a breathing tube extending therefrom and a mouthpiece at the end of the breathing tube;
   (b) means for supplying a secondary air flow at higher pressure, a pressure tube extending therefrom and a nebulizer at the end of the tube connecting into the breathing tube passageway adjacent to the mouthpiece adapted to carry a liquid medicament and to effect a spray of nebulized medicament into the breathing tube with the secondary flow to normally interblend with the low-pressure air flow therein; and,
   (c) a closing means adjacent to the mouthpiece traversing the breathing tube adapted to stop the discharge therethrough whereby the high-pressure, medicament-carrying secondary flow reverses the primary low-pressure air flow and back up into the breathing tube to fill a portion of the tube adjacent to the mouthpiece with unblended medicament-carrying secondary flow to be released when said closing means are again opened.

2. In the organization set forth in claim 1, wherein said closing means includes a valve having a bypass to the atmosphere and a closure means adapted to close the bypass in one position to permit air to flow from the breathing tube and through the mouthpiece and to open the bypass at another position to communicate with the mouthpiece and at the same time to close the breather tube exit.

3. In the organization set forth in claim 1, wherein the closing means includes a directional flap valve and a manually operated plunger means adapted to depress the flap valve to effect closure thereof.

4. In the organization set forth in claim 1, including an enlarged portion in the breathing tube adapted to form a reservoir to contain the medicament-carrying secondary flow backed up into the breathing tube when said closing means closes to effect said reverse flow into the breathing tube.

5. In the organization set forth in claim 1, wherein said closing means includes a valve and an automatic cycling means associated with the valve adapted to open and close the valve at regular intervals corresponding with a patient's normal breathing cycle.

6. In the organization set forth in claim 5, wherein said cyclic means includes an air motor adapted to be operated by said air flow means.

7. In the organization set forth in claim 1, including a T-connection in the breathing tube adjacent to the mouthpiece, wherein the breathing tube is connected to one leg of the T, the mouthpiece is connected to a second leg of the T, and the nebulizer is connected to the third leg of the T.

8. In the organization set forth in claim 7, including a valve in that leg of the T connecting with the mouthpiece.

9. Apparatus for positive pressure breathing therapy adapted to interblend a low-pressure primary air flow with a high-pressure secondary air flow carrying a nebulized medicament and to selectively cut off the primary and secondary air flows to regulate the concentration of the medicament to a patient during the inspiration and expiration cycles of breathing and including, in combination:

(a) means for supplying a primary air flow at a low pressure, a breathing tube extending therefrom, and a mouthpiece at the end of the breathing tube;

(b) means for supplying a secondary air flow at higher pressure, a pressure tube extending therefrom, and a nebulizer at the end of the pressure tube connecting into the breathing tube passageway adapted to carry liquid medicament and to effect a spray, a nebulized medicament into the breathing tube with the secondary flow to normally interblend with the low-pressure air flow;

(c) a closing means adjacent to the mouthpiece adapted to close the discharge therefrom whereby to permit the higher pressure secondary air flow through the nebulizer to back up into the breathing tube and to fill a portion of the breatihing tube with the medicament-carrying secondary flow and to release said spray when closing means are again opened; and, (d) a closing means at the pressure tube adapted to close off the high-pressure secondary flow through the nebulizer whereby to stop the nebulized flow into the breathing tube.

10. In the apparatus set forth in claim 9, wherein the mouthpiece closing means and the pressure tube closing means are operatively interconnected whereby to operate in alternate sequence.

11. In the organization set forth in claim 9, wherein the closing means of the pressure tube includes a bypass adapted to be opened to drop the pressure flow in the pressure tube and prevent operation of the nebulizer.

12. In positive pressure breathing therapy where a primary air flow is supplied to a patient through an inspirator breathing tube and a secondary, lesser air flow carrying a nebulized medication is discharged into the inspirator breathing tube adjacent to its exit to interblend with the primary flow during an inspiration cycle of breathing, a sequence adapted to provide a patient with concentrated medication at the beginning of an inspiration cycle and a more diluted medication in the latter phase of the inspiration cycle, including the steps of closing the inspirator breathing tube at its exit during an expiration cycle of breathing, stopping and reversing the primary flow in the inspirator breather tube and filling the portion of the inspirator breathing tube adjacent to its exit with said secondary air flow as the primary flow is reversed whereby to permit the inhalation of an unblended medicament carrying secondary flow at the beginning of the following inspiration cycle of breathing.

13. In the process set forth in claim 12 wherein said secondary flow is at a pressure substantially greater than the primary air flow and said reversal of the primary air flow occurs as the inspirator breathing tube exit is closed and the said secondary air flow displaces air within the breathing tube.

14. In the application of medicated positive pressure breathing therapy wherein inspiration by a patient is from a mouthpiece at the exit of an inspirator breathing tube, a primary air flow is passed through the breathing tube at a selected low pressure and a nebulized medication is administered by a secondary higher-pressure air flow through a medicament-carrying nebulizer and into the breathing tube adjacent to its mouthpiece, a process adapted to provide a patient with concentrated medication at the beginning of an inspiration cycle and a more diluted medication in the latter phase of the inspiration cycle to blend with the primary airflow as the same is inspired, including the steps of stopping flow through the tube at the mouthpiece as the expiration cycle of breathing commences, reversing the primary air flow in the tube and filling a portion of the breathing tube adjacent to the mouthpiece with medicament-carrying secondary air flow as the reversal of primary flow occurs whereby to permit the inhalation of the medicament-carrying secondary air flow at the beginning of the following inspiration cycle.

15. In the process set forth in claim 14 the further steps, of stopping, during the succeeding inspiration cycle, the secondary flow through the nebulizer whereby to permit a patient to inhale a maximum concentration of nebulized medication at the commencement of an inspiration cycle and a minimum concentration of nebulized medication at the end of the inspiration cycle.

References Cited by the Examiner

UNITED STATES PATENTS

| | | | |
|---|---|---|---|
| 1,337,225 | 4/1920 | Heald | 128—29 |
| 2,598,525 | 5/1952 | Fox | 128—185 |
| 2,972,345 | 2/1961 | Spigel | 128—29 |
| 3,221,733 | 12/1965 | Beasley | 128—29 |

RICHARD A. GAUDET, *Primary Examiner.*

C. F. ROSENBAUM, *Assistant Examiner.*